Patented Aug. 31, 1937

2,091,840

UNITED STATES PATENT OFFICE 2,091,840

VERMIFUGE

Grover D. Turnbow, Oakland, Calif.

No Drawing. Application September 30, 1930,
Serial No. 485,549

9 Claims. (Cl. 167—53)

This invention relates to improvements in vermifuge preparations and has to do more particularly with a compound for the eradication of worms from the intestinal tracts of animals and the method of preparing such a compound.

There are certain substances exceedingly toxic to animals, both mammals and birds, when they come in contact with the mouth and throat under which circumstances death of the animal or fowl will usually, if not inevitably, result. In view of the fact that some of these toxic substances have highly important medicinal properties in the treatment of both birds and mammals for the elimination of certain parasites, means for administering these products without the toxic effects are highly important. Substantially all of the procedures thus far in use have been of such nature that administering the doses manually to the animal or fowl being treated has been necessary. One of the reasons for this has been that no practical means has been found whereby the product could be put up in sufficiently finely divided condition to be mixed with the feed, and again, the toxicity of the products in the form given has been such that the amount required to destroy the parasites has been only slightly less than lethal dose. Therefore, if administering by means of feeding as to a flock of chickens was resorted to, the result would be that some of the fowls would take more feed than others and thereby secure sufficient quantity to produce death. Or if the amount of the toxic products were held to a point where poisonous effects would not be produced, there would be in some cases too small an amount of product taken to destroy the parasites.

One of the important objects of the present invention is to produce a medicinal compound in the form and condition which will permit its being mixed with feed for fowls and animals whereby they will obtain the necessary dosage to destroy the parasites, while at the same time the medicinal compound will be sufficiently non-toxic to the fowls or animals being treated so that they will not be injured even though the amount taken be materially in excess of that required to destroy the parasites.

The product of the present invention lends itself readily to being prepared in finely divided condition and may be administered in that condition without ill effect. It can also be taken in quantities greater than is actually required to destroy the parasites without ill effects which therefore makes the product especially suitable for administering with feed. The factor of safety may be said to be greatly increased.

The product of the present invention is not only non-poisonous in the mouth and throat of the fowl or animal but remains so throughout the digestive tract but nevertheless results in a destruction of the parasite. In view of the fact that the product may be administered in finely divided condition, it is therefore apparent that the grinding action of the gizzard in fowls is not a factor in its usefulness.

The present invention relies upon incorporating the active substances with a product of the nature of agar-agar. Preferably, in the treatment of certain parasites of the alimentary tract of fowls, nicotine substances are used and these nicotine substances are incorporated in agar-agar. Apparently, the nicotine substances which would normally be toxic may be said to be rendered inert when incorporated in agar-agar, insofar as the animal or fowl is concerned but yet remains destructive to parasites. In all events, it has been found that with a medicinal preparation composed of agar-agar and nicotine substances, the preparation can be administered to healthy fowls without any ill effects whatsoever. In carrying out the invention, the agar may be in such solution as will produce a comparatively firm jell, or the water content may be reduced to so low a percentage that the agar-agar forms a very firm structure.

One specific application of the present invention is the production of a compound for the treatment of Ascaridia Lineata in chickens. In this instance, the procedure is as follows. For best results there should be from 5% to 7%, or what for present purposes will be said to be approximately 6%, agar-agar in the finished product. In preparing the product the agar is mixed with water which is heated to a temperature sufficiently high to cause the agar to go into colloidal solution. This solution is then cooled to approximately 125° F. a range from about 120° to 130° F. having been found practical in the commercial manufacture of the present product, after which the nicotine substance is added. One convenient source of nicotine is the preparation known commercially as Black Leaf 40, ten pounds of which is added to each eighty-eight pounds of the agar solution. This Black Leaf 40 contains approximately 40% nicotine sulphate. While the entire mixture is still hot it is cast into molds and allowed to cool and set. When set it may be cut into approximately two-gram sizes or, if desired, instead of molding in large bodies and cutting, the mixture may be cast or molded directly into containers having a capacity for two-grams. These two-gram particles of the product are then dried for approximately thirty-six hours. It is to be understood that this period of drying depends considerably upon the temperatures used. The actual time for drying any particular batch may be determined in that each two-gram particle should be dried until it has been reduced to one-half of its original size. The product, in this form, is quite hard and of the proper size for administering in doses.

Instead of reducing the jelled material to two-gram particles, the jelled material, before drying, may be chopped up into comparatively small particles and dried, or it may be dried and then ground to the size particle desired. In this form it may be given to chickens in proportions sufficient to deliver 80 milligrams of nicotine sulphate per bird, which amount is ample as an efficient vermifuge. Quantities considerably in excess of 80 milligrams may be taken without injury to the bird; on the other hand, less than 80 milligrams will destroy the parasites.

The amount of agar used depends primarily upon the firmness it is desired to have in the finished product and the smoothness that it is wished to impart to the product to facilitate administering the compound. For instance, a satisfactory product has been made by using an increased strength of agar and an increased amount of Black Leaf 40. These increased quantities eliminate the necessity of the drying process but require the cutting of the particles into smaller size. The use of the agar in the combination described will be found to be highly desirable. Again, this agar lends what might be termed maximum stability to the product. Furthermore, the product thus prepared can be shipped in any ordinary type of container.

In the foregoing description the use of nicotine sulphate specifically has been referred to. However, other products have been prepared in accordance with the present invention. Kamala has been used in lieu of the nicotine sulphate and in combination with the nicotine sulphate in the agar. These products having incorporated therein kamala, which is treatment for tape worms in poultry, are also prepared in the granulated form for feeding in the mash.

Obviously, other toxic compounds can be incorporated with agar-agar in a manner similar to that used with nicotine and kamala and similar results produced.

What I claim is:

1. A medicinal compound in finely divided condition comprising a normally toxic substance incorporated in agar-agar in proportions to render said substance substantially non-toxic to fowls when given in quantities sufficient to destroy parasites of the intestinal tract.

2. A medicinal compound in finely divided condition comprising agar-agar and nicotine substance, said compound being non-toxic to fowls when given in quantities sufficient to destroy parasites of the intestinal tract.

3. A non-toxic medicinal compound consisting of agar-agar and kamala.

4. A non-toxic medicinal compound consisting of agar-agar, nicotine sulphate and kamala.

5. The process of producing a non-toxic medicinal compound which consists in forming a mixture of water and agar agar with the agar-agar in colloidal condition, cooling said mixture and adding a toxic substance thereto and then permitting said mixture to jell.

6. The process of producing a non-toxic medicinal compound which consists in forming a mixture of water and agar-agar with the agar agar in colloidal condition, cooling said mixture and adding a toxic substance thereto, then permitting said mixture to jell, and then drying said gelatinous material.

7. A compound of the character described in finely divided condition comprising a normally lethal dose of toxic substance incorporated in a substance of colloidal nature, said colloidal substance colloidally holding the toxic substance to protect against the effect of such dose.

8. The process of producing a non-toxic compound which consists in forming a mixture of water and a colloid with the latter in colloidal condition, cooling said mixture and adding a toxic substance thereto, and then permitting said mixture to jell, said colloid being capable of colloidally holding said toxic substance to protect against the lethal effect of the latter.

9. The process of producing a non-toxic compound which comprises forming a mixture of water and a colloid with the latter in colloidal condition, cooling said mixture, adding a toxic substance thereto, permitting said mixture to jell, and reducing the jelled masses to comminuted condition, said colloid being capable of colloidally holding said toxic substance to protect against the lethal effect of the latter.

GROVER D. TURNBOW.